Oct. 8, 1968 J. W. KAIM 3,404,754
RAILWAY WHEEL TREAD BRAKE
Filed Oct. 25, 1966 2 Sheets-Sheet 1
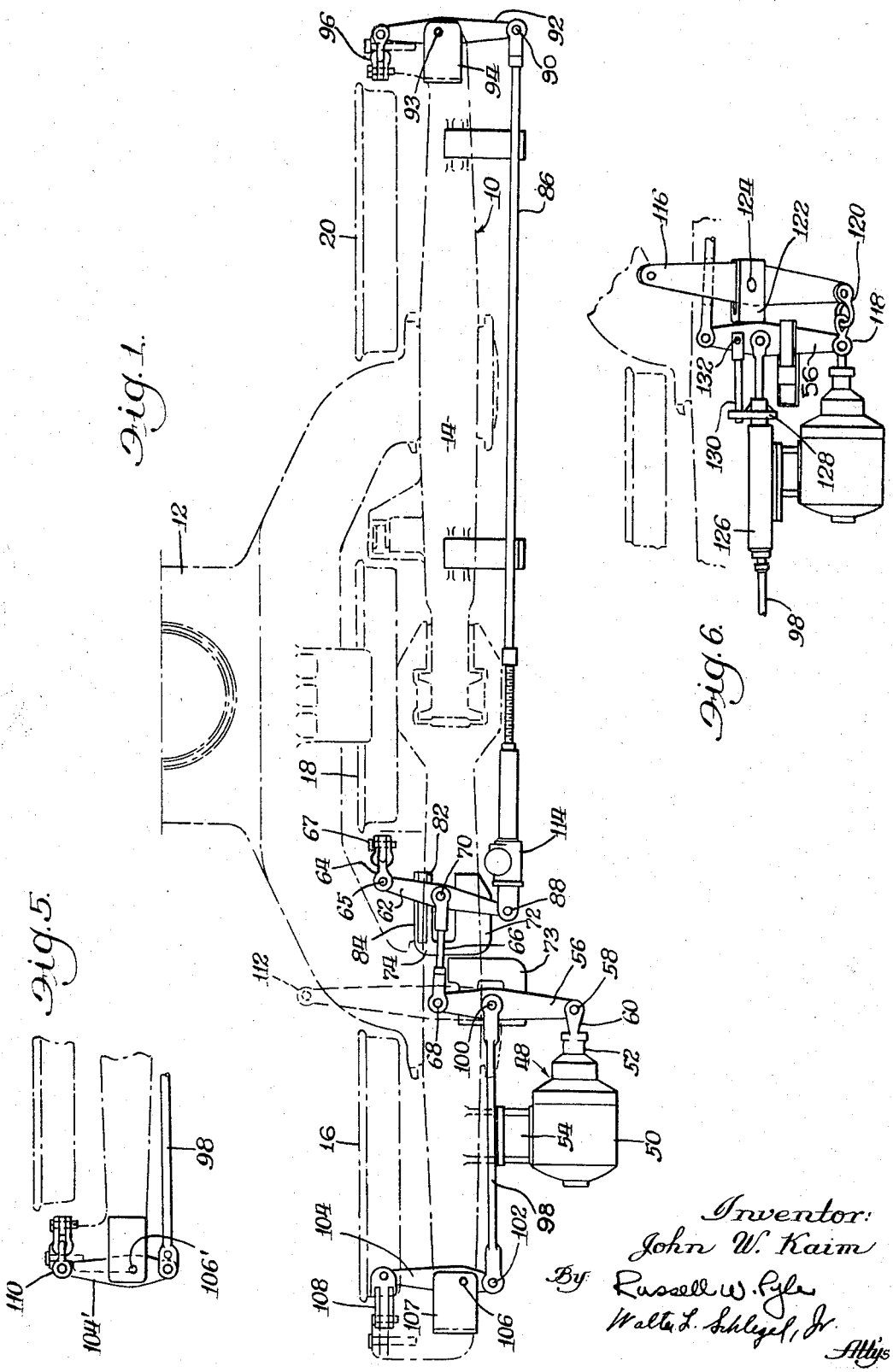

Oct. 8, 1968  J. W. KAIM  3,404,754
RAILWAY WHEEL TREAD BRAKE
Filed Oct. 25, 1966  2 Sheets-Sheet 2
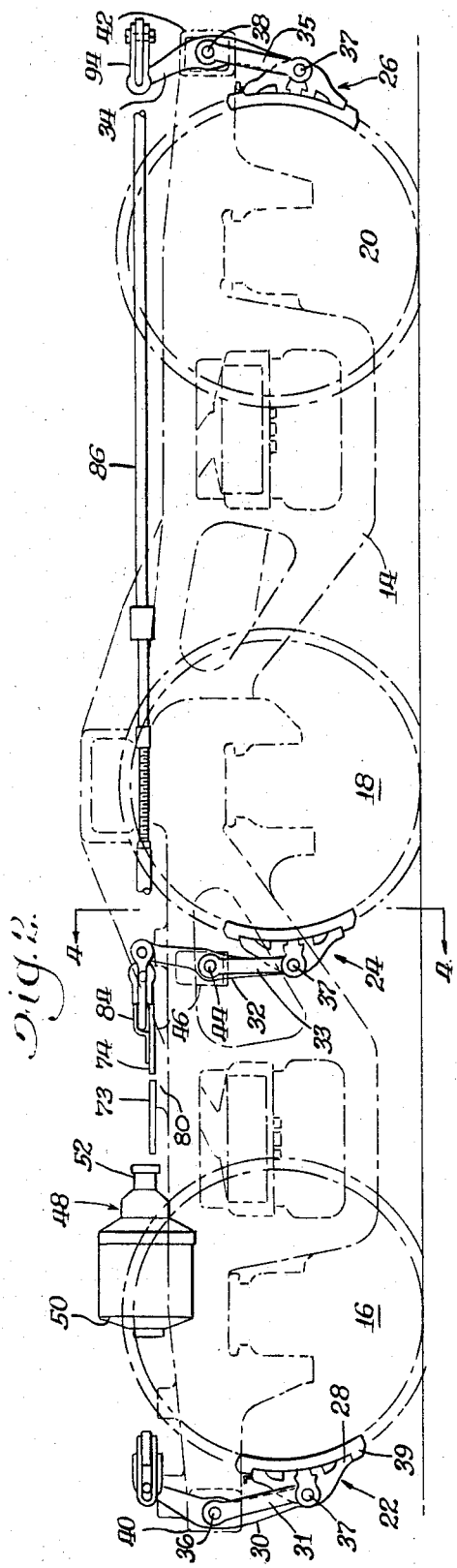
Inventor:
John W. Kaim
By Russell W. Pyle
Walter J. Schlegel, Jr. Attys.

United States Patent Office 3,404,754
Patented Oct. 8, 1968

3,404,754
RAILWAY WHEEL TREAD BRAKE
John W. Kaim, Chicago, Ill., assignor to Amsted Industries Incorporated, Chicago, Ill., a corporation of New Jersey
Filed Oct. 25, 1966, Ser. No. 589,314
11 Claims. (Cl. 188—47)

ABSTRACT OF THE DISCLOSURE

A brake linkage arrangement for three wheels aligned along one side of a railway truck includes a power cylinder connected to a cylinder lever which actuates the brake lever of one of the end wheels. The cylinder lever is also connected to a floating lever which actuates the brake levers on the other two wheels. Provision is made for incorporation of a hand brake lever and a slack adjuster in the arrangement.

---

This invention relates to rigging for railway car trucks, and more particularly to a brake arrangement for a six-wheel type railway truck.

An object of this invention is to provide a simple and efficient brake linkage arrangement that can be used alone or in combination with a rotor brake system.

Another object of this invention is to provide a general brake ararngement that may be employed in a limited amount of space.

The above and other objects will become apparent to those skilled in the art from the following description and appended claims, and in connection with the accompanying drawings wherein:

FIGURE 1 is a fragmentary top plan view of a railway car truck embodying the invention, only one-half of the truck being shown inasmuch as the opposite side of the arrangement of the truck is similar to the arrangement shown;

FIGURE 2 is a fragmentary side elevational view of the structure shown in FIGURE 1;

FIGURE 3 is a fragmentary end elevational view of the structure shown in FIGURE 2, as seen from the left;

FIGURE 4 is a fragmentary sectional view taken along line 4—4 of FIGURE 2;

FIGURE 5 is a fragmentary portion of FIGURE 1, showing a modification of the invention; and FIGURE 6 is a fragmentary portion of the structure shown in FIGURE 1, which additionally shows an alternative positioning of a hand brake lever.

It will be understood that for the purpose of clarity, certain details have been omitted from some of the views where those details are more clearly illustrated in other views.

With reference now more particularly to the drawings, the invention is shown in connection with a railway truck frame 10 of conventional design, having a bolster 12 associated therewith, and side frames 14 associated with the bolster and wheels 16, 18 and 20, all having a design known to those skilled in the art.

As shown in FIGURE 2, means are provided to frictionally engage the wheels 16, 18 and 20, which comprise brake shoe assemblies 22, 24 and 26, each disposed adjacent to each respective wheel. Additionally, it will be noted that two adjacent brake assemblies, 22 and 24, are located on the same side of their respective wheels 16 and 18 relative to the other brake assembly 26. Each of the brake assemblies is shown having a brake head 28 keyed to a brake shoe 39 for frictional engagement with a contacting surface on a corresponding wheel.

Corresponding to each of the brake heads 28 are substantially vertical brake levers 30, 32 and 34, the lower ends of which are pivotally connected by pins 37 to their respective brake heads. The two end brake levers 30 and 34 are fulcrumed intermediate their ends by pins 36 and 38 to respective gussets 40 and 42 secured to side frames 14. The central lever 32 is also fulcrumed intermediate its ends by a pin 44 held within a bracket 46 secured to side frame 14. As shown in FIGURES 2, 3 and 4, brake hangers 31, 33 and 35 pivotally depend from fulcrum pins 36, 38 and 44 downwardly to a pivotal connection with respective pins 37 associated with each brake head 28, thereby providing additional support for the brake shoe assemblies 22, 24 and 26.

Means 48 are provided to actuate the brakes, such as a power cylinder 50 with a piston rod 52 projecting longitudinally inwardly from the truck and actuated by the power cylinder. The power cylinder 50 is preferably secured by a mounting bracket 54 near the top of the side frame 14 at a location intermediate the two adjacent brake assemblies 22 and 24 located on the same side of their respective wheels 16 and 18.

As shown in FIGURE 1, a substantially horizontal cylinder lever 56 is provided, the outboard end thereof pivotally connected by a pin 58 through aligned holes in a bifurcated end 60 of the piston rod 52. A substantially horizontal floating or equalizing lever 62 is also provided, the inboard end thereof pivotally connected by clevises 64 to the upper end of the central vertical brake lever 32. It will be understood that all clevises mentioned herein, unless otherwise specified, have bifurcated ends with aligned openings therein to receive pins, such as pins 65 and 67 in clevises 64, whereby a tension pivotal link is formed between two corresponding members, as between levers 62 and 32. The inboard end of cylinder lever 56 and a central portion of horizontal floating lever 62 are pivotally interconnected by a pull rod 66 having bifurcated ends with aligned openings for assembly of pins at pivotal connections 68 and 70.

A bracket 72 is provided for supporting the cylinder lever 56 and the floating lever 62, which bracket comprises two generally U-shaped horizontal supporting surfaces 73 and 74 closely adjacent or contiguous with one another. The two U-shaped surfaces 73 and 74 may have a common base 80 (FIGURE 2) secured to a side frame member 14. Also, one or more arms 82 of U-shaped surfaces 73 and 74 may have a guide member 84 disposed parallel thereto and secured near one end of said arms of said surfaces.

Brake assembly 26 is actuated by a pull rod 86 having bifurcated ends with aligned openings, one end of said rod being pivotally connected to the outboard end of the floating lever 62 by pin 88, the other end thereof pivotally connected by pin 90 to the outboard of dead actuating lever 92, which is fulcrumed intermediate its ends at 93 to the frame 14 in a horizontal U-shaped bracket 94 secured to the frame. The inboard end of dead actuating lever 92 is pivotally connected by clevises 96 to the upper end of vertical brake lever 34.

Brake assembly 22 is actuated by a pull rod 98 having bifurcated ends with aligned openings, one end of said rod pivotally connected by pin 100 to cylinder lever 56, intermediate the ends of said lever, the other end of said pull rod pivotally connected by a pin 102 to the outboard end of dead actuating lever 104, which is fulcrumed at 106 to the frame 14 in a horizontal U-shaped bracket 107 secured to the frame. The inboard end of dead actuating lever 104 is pivotally connected to the upper end of vertical brake lever 30 by a rigid compression member or yoke 108. Also, it will be noted that dead actuating lever 104 is disposed longitudinally inwardly of its corresponding brake lever 30, while the opposite dead lever 92 is generally disposed longitudinally outwardly of its corresponding brake lever 34.

FIGURE 5 illustrates an alternate arrangement of dead actuating lever 104′ in relation to its corresponding brake lever 30, whereby a tension rather than a compression link may be employed. Lever 104′ may be located outboardly of lever 30 and said levers may be pivotally connected by a clevis 110. A bracket 107 is secured near the end of frame 14 to fulcrum lever 104.

As shown in FIGURE 1, a hand lever, shown by dotted lines at 112 may be secured to the inboard end of cylinder lever 56, for manual operation of the brake system. An automatic slack adjuster 114 may be located near floating lever 62 as part of pull rod 86.

An alternate location of a hand brake lever is shown in FIGURE 6. Here a separate hand lever 116 is pivotally secured to the outboard end of cylinder lever 56 by a pair of links 118 and 120, which permit the hand lever 116 to be disposed upwardly and inboardly from its pivotal connection to link 120. The hand lever 116 is fulcrumed in an angularly disposed bracket 122 secured to frame 14 and having aligned openings for a pin 124 passing through said bracket and lever.

An alternate location for a slack adjuster is also shown in FIGURE 6. The slack adjuster 126 is interposed as part of the pull rod 98, with a ring bracket 128 secured near the inner end of said slack adjuster. A rod 130 is provided to hold the slack adjuster 126 rotationally stationary, one end of said rod secured to bracket 128, the other end thereof pivotally connected at 132 to the cylinder lever 56. Other details in FIGURE 6 are substantially identical with those shown in FIGURE 1.

Describing the operation of the brake arrangement, actuation of power cylinder 50 causes piston rod 52 to extend longitudinally inwardly of the truck, thereby rotating cylinder lever 56 in a counterclockwise direction, thereby causing tension on pull rod 66 and hence floating lever 62. The central brake lever 32 is caused to rotate in a counterclockwise direction on its fulcrum pin 44, whereby brake assembly 24 moves toward a contacting surface on wheel 18. Simultaneously, tension on floating equalizer lever 62 transmits tension through pull rod 86 to dead actuating lever 92, thereby causing rotation of brake lever 34 in a clockwise direction around its fulcrum pin 38, whereby brake assembly 26 moves toward a contacting surface on wheel 20.

At the same time, the inward movement of the central portion of cylinder lever 56 causes tension to be transmitted through pull rod 98 to dead actuating lever 104, thereby causing compression of link 108 against the upper end of brake lever 30, hence causing said brake lever to rotate counterclockwise around its fulcrum pin 36, whereby brake assembly 22 is caused to move toward a contacting surface on wheel 16. In the alternate application shown in FIGURE 5, the actuation of lever 104 causes tension to be placed on clevis 110 and hence the upper end of brake lever 30 thereby producing the same result.

It will now be understood that the actuation of the free end of hand lever 112 or 116 in a counterclockwise direction will cause operation of the brake system identical to that heretofore described.

It will also be understood that various changes in the details, steps and arrangement of parts, which have been herein described and illustrated in order to explain the nature of the invention may be made by those skilled in the art within the principle and scope of the invention as expressed in the appended claims.

I claim:

1. In a brake arrangement for three wheels aligned along one side of a six wheel railway truck, the combination of: friction means to engage each of the wheels, first, second and third dead brake levers fulcrumed intermediate their ends and adjacent respective wheels for actuating said friction means, said first and second brake levers disposed on corresponding sides of their respective wheels, first and second dead actuating levers operatively connected to said first and third brake levers respectively, a cylinder lever, a floating lever, the inboard end of said floating lever actuating said second brake lever, a first pull rod pivotally interconnecting said cylinder lever and said floating lever, a second pull rod pivotally interconnecting said first dead lever and said cylinder lever, a third pull rod pivotally interconnecting said floating lever and said second dead lever, and power means connected to one end of said cylinder lever for actuation thereof.

2. The combination of claim 1 wherein said first dead actuating lever is disposed outwardly of said first brake lever, and wherein said second dead actuating lever is disposed outwardly of said third brake lever, and wherein links connect the dead actuating levers respectively to the first and third brake levers.

3. The combination of claim 1 wherein said first dead actuating lever is disposed inwardly of said first brake lever with a tension interconnecting link therebetween, and wherein said second dead lever is disposed outwardly of said third brake lever with a tension interconnecting link therebetween.

4. The combination of claim 2 wherein a hand brake lever extension is formed on an end of said cylinder lever opposite the end thereof actuated by said power means, and wherein said third pull rod comprises slack adjuster means.

5. The combination of claim 2 wherein a separate handbrake lever is provided, one end thereof connected by a link to the same end of said cylinder lever actuated by said power means, said hand brake lever fulcrumated intermediate its ends.

6. In a brake arrangement for three wheels aligned along one side of a six wheel railway truck, the combination of: friction means to engage each of the wheels, first, second and third dead brake levers fulcrumated intermediate their ends, the lower ends of said brake levers pivotally connected to said friction means, said first and second brake levers disposed on corresponding sides of their respective wheels, said third brake lever disposed on the opposite side of its respective wheel relative to said first and second brake levers, first and second substantially horizontal dead actuating levers fulcrumed intermediate their ends, the inboard ends thereof actuating said first and third brake levers respectively, a horizontal cylinder lever, a horizontal floating lever, the inboard end of said floating lever actuating the upper end of said second brake lever, a first pull rod pivotally interconnecting the inboard end of said cylinder lever and a central portion of said floating lever, a second pull rod pivotally interconnecting the outboard end of said first dead actuating lever and said cylinder lever intermediate its ends, a third pull rod pivotally interconnecting the outboard end of said floating lever and to the outboard end of said second dead actuating lever, and power means intermediate said first and second brake levers operatively connected to outboard end of said cylinder lever.

7. The combination of claim 6 wherein said first dead actuating lever is disposed inwardly of said first brake lever with a compression interconnection therebetween; wherein said second horizontal dead actuating lever is disposed outwardly of said third brake lever with a tension interconnection therebetween; and wherein the inboard end of said horizontal floating lever and the upper end of said second brake lever have tension interconnection therebetween.

8. The combination of claim 6 wherein said first horizontal dead actuating lever is disposed inwardly of said first brake lever with a tension interconnection therebetween; and wherein said second horizontal dead lever is disposed outwardly of said third brake lever with a tension interconnection therebetween.

9. The combination of claim 7 wherein a handbrake lever extension is formed on the inboard end of said cylinder lever; and wherein a slack adjuster is interposed on said third pull rod.

10. The combination of claim 7 wherein a separate angularly disposed hand brake lever is provided, one end thereof connected by a tension link to the outboard end of said cylinder lever, said hand brake lever fulcrumed in an angularly disposed bracket.

11. The combination of claim 8 wherein a slack adjuster is interposed on said first pull rod.

References Cited

UNITED STATES PATENTS

| | | | |
|---|---|---|---|
| 1,750,566 | 3/1930 | Browall | 188—47 |
| 2,391,664 | 12/1945 | White | 188—107 |
| 2,827,131 | 3/1958 | Davis | 188—56 |
| 3,036,666 | 5/1962 | Schlosser | 188—56 X |
| 3,344,895 | 10/1967 | Holden et al. | 188—107 |

DUANE A. REGER, *Primary Examiner.*